Figure 1:
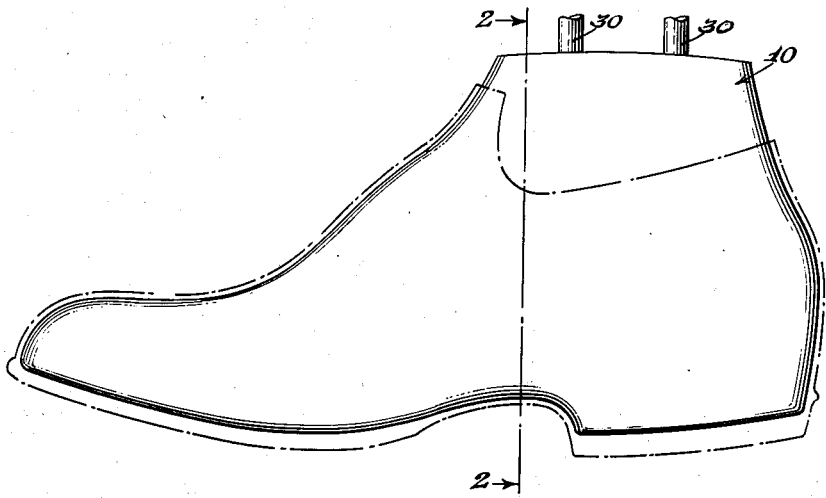

July 1, 1941.    L. NAST    2,247,818

SHOE LAST

Filed Nov. 2, 1939

INVENTOR.
Leo Nast
BY
ATTORNEY.

Patented July 1, 1941

2,247,818

UNITED STATES PATENT OFFICE 2,247,818

SHOE LAST

Leo Nast, New Brunswick, N. J., assignor to Universal Plastics Corporation, New Brunswick, N. J., a corporation of New Jersey Application November 2, 1939, Serial No. 302,481

3 Claims. (Cl. 18—46)

This invention relates to forms or lasts for the manufacture of rubber boots and shoes, particularly galoshes.

Boots or shoes of rubber and rubberized material are assembled by hand upon forms or lasts of various pieces of vulcanized, rubberized fabrics and sheeted rubber stock. The still tacky material assembled on the forms or lasts is then cured in different manners.

The boots or shoes are put on racks within airtight chambers and heated therein by dry steam or hot air at temperatures up to about 280° F. and under superatmospheric pressure up to about 60 and 80 lbs. per sq. inch. Instead of steam or air, non-oxidizing gases may be used. Heating is effected by coils or jackets in which steam of corresponding temperature circulates, if no steam or heated air or gas is directly introduced into the space of the chamber. After curing for a certain period of time, sometimes for many hours, the finished rubber goods are removed from the chambers, or further treated therein in the presence of air or dry carbon dioxide gases at pressures even above 80 lbs. and still at elevated temperature, if desired.

In another process of manufacture, the boots or shoes assembled on the forms or lasts are first treated in an air-tight chamber under reduced pressure, particularly in vacuo, in order to remove moisture and air contained and trapped in and between the pieces of the boots and shoes to be joined in order to obtain seams free of blisters, and thereafter heat and pressure is applied in the ways described above.

This manufacture of rubber boots and shoes is very cumbersome, because the pieces of which the boots and shoes are to consist have to be assembled by hand. On account of the low prices however which are paid for these articles the work has to be done as speedily as possible. A great many of these articles are to be cured simultaneously in the vulcanizing chambers for a rather extended period of time which necessitates having a large number of lasts in stock; while a number of them have to be in those chambers for a given time for curing the goods assembled thereon, other loads of vulcanized pieces are being assembled on other sets of lasts outside. Furthermore, various shapes and sizes of those boots and shoes are needed which again increases the number of forms and lasts to be kept in and added to the stock.

Since the pieces must be assembled by hand, they must be held by the worker during assembly, or at least must be put on the work table and then on the racks and again removed from there after vulcanization. Such forms or lasts therefore must be relatively light in weight so as to avoid the worker's being tired out too quickly, and also to reduce the weight of the assembled units on the racks which are to be inserted in and removed from the vulcanizing chambers. The forms or lasts are heated in the chambers and the heat consumed by them is wasted for the manufacture itself.

Forms and lasts were first made of wood. Wood is however hygroscopic and absorbs moisture from the steam used for heating the vulcanizing chamber, and changes thereby its shape and size. Furthermore, wood is incapable of resisting the high temperatures prevailing in the vulcanizing chambers for a longer period of use, and carbonizes or deteriorates.

It has been suggested therefore to replace wooden lasts by metal ones. The lasts were made of iron and cast in molds. Iron is very heavy, and consequently handling of iron lasts soon fatigued the worker. Furthermore, cast lasts must be finished after casting which increases their price. Iron is also a good heat conductor and of relatively high specific heat, making it consume a great amount of the heat applied in the vulcanizing chamber.

It has therefore also been suggested to make such lasts of a light metal, such as aluminum. Though the specific weight of aluminum amounts to only about one third of iron, its specific heat amounts to more than twice that of iron. It also oxidizes superficially at elevated temperatures as prevailing in the vulcanizing chamber, and the oxides formed are undesirable in the manufacture concerned.

Moreover, casting of aluminum or other metal into final shape necessitates a finishing process in order to remove ridges.

Furthermore, whatever process of casting metal lasts is used, new molds are to be prepared for each last, thus increasing their manufacturing costs and consequently of the rubber goods made with them.

It is therefore an object of the invention to make forms or lasts for rubber goods, particularly boots and shoes, of a moldable material which can be made in many hundreds and thousands of pieces by means of the same mold.

It is another object of the invention to make such lasts of material which after molding does not require a subsequent finishing process; the form or last leaves the mold ready for use.

It is still another object of the invention to make the forms or lasts of a material which is unchanged by the conditions under which the rubber goods are made, in particular, to neither oxidize nor expand to a degree at which the shape or size are changed, as is the case with metal.

It is still another object of the invention to make the forms or lasts of a material of light weight, particularly of lower weight than iron or even aluminum.

It is a further object to reduce the amount of heat consumed by the last during the curing of the rubber goods.

It is a further object of the invention to make such forms or lasts of a material of low cost.

It is still a further object of the invention to render the manufacture of rubber boots or shoes more economical and efficient than heretofore.

According to the invention, a thermo-setting moldable material is used for the manufacture of forms or lasts for rubber shoes and boots, particularly of the type of the well known condensation products of phenol and formaldehyde, or derivatives or mixtures thereof with other substances, such as urea. In particular, such material is used admixed with fillers of proper qualities, such as asbestos powder.

Condensation products of the type used by the invention are composed of about 1 mol phenol and 1 to 2.5 mols formaldehyde. They are available on the market either in a viscous state, or even in powdery form ready for molding under heat and pressure. They are particularly available in the form of powders ready to be molded in a fast process, taking only a few minutes for curing the material. Such powders are also available admixed with desired fillers, such as asbestos powder, wherein the filler amounts up to 50% to 80% by weight of the powder.

The specific weight of the condensation product without filler is very low and amounts to far less than half the specific weight of aluminum. Its heat conductivity is very small and appreciably lower than that of any metal.

If viscous material is used admixed with a filler, it can be molded in a form at temperatures up to about 320° to 340° F. under a surpressure up to about 8 atmospheres, and it solidifies within the mold within a few minutes. It can be taken out of the mold without changing its shape, and put in a chamber for final curing. If rapidly working powder is used, it can be molded and cured at about the same ranges of heat and pressure even within several minutes, and no further curing after molding is needed at all.

The product obtained is in any case shock- and blow-proof and not breakable for all practical purposes involved in the manufacture of rubber goods; it does not melt and is resistant to attacks by any chemicals contained in the rubberized material and stock and also against water and oxygen up to temperatures far above 550° F. The lasts do not expand while heated in the curing chamber where the boots or shoes are manufactured, but keep their shape and size due to the extremely low temperature expansion coefficient of this moldable material. These qualities make the material perfectly suited for manufacturing rubber goods of the kind referred to herein which are subjected to temperatures in the curing chambers up to about 280° F. only.

The same molds can be used for manufacturing many thousands and even tens of thousands of lasts of the same shape and size.

The moldable thermo-setting powder including the filler is relatively cheap.

This proves that with the use of a thermo-setting moldable material, particularly powdery material with admixed fillers, if desired, a form or last is obtained which answers the requirements of the manufacture of rubber boots and shoes in every respect, is light in weight and does not consume any undue amount of heat. The investment for a stock of various sizes and shapes of such lasts is therefore relatively low and new shapes and sizes can be manufactured in large amounts at low costs as to material, molds and labor; no finishing and removal of ridges is necessary.

In the drawing a last is shown by way of example, embodying the invention.

Figure 2:
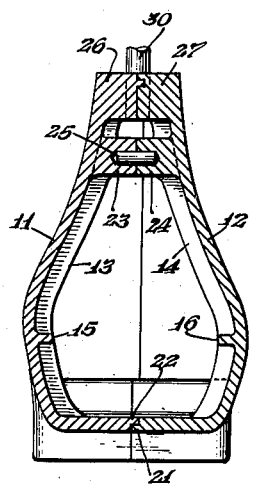
Figure 3:
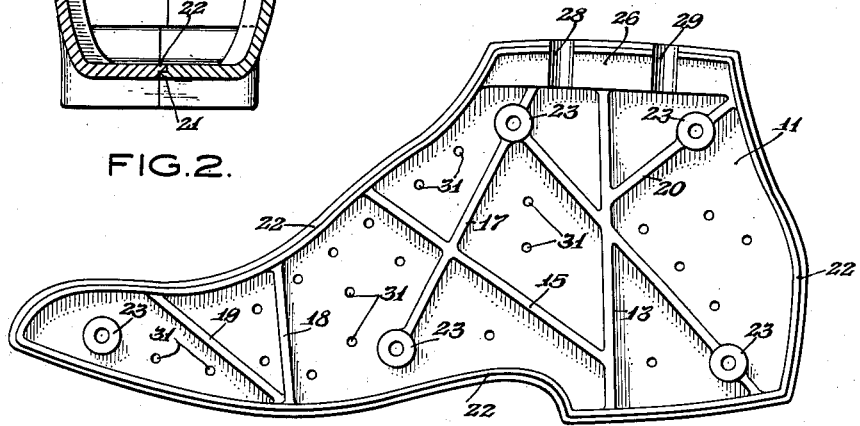

Fig. 1 shows a side elevation of a hollow last and rubber shoe assembled thereon, the latter shown in dotted lines; Fig. 2 a cross-section along line 2—2 in Fig. 1, showing the two assembled portions of a hollow last, and Fig. 3 a side elevation of the inside of one of the parts of which the last is composed.

It is understood that the invention is not limited to the exemplification shown in the drawing, but is to be derived in its broadest aspect from the appended claims.

The last 10 which is composed of two thin walled parts 11, 12 of a thermo-setting moldable material, particularly a phenol and formaldehyde condensation product admixed with a filler, such as asbestos powder, is molded in the shape of the halves 11, 12 and cured, so that it remains solid at all temperatures applied in the manufacture of rubber boots or shoes. In particular, it is solid at temperatures substantially above 280° to 300° F.

The halves are immediately molded in proper molds into their final shape in which they are preferably provided with reinforcing ribs 13, 14, 15, 16, 17, 18, 19, 20. The edges of the halves are provided with engaging flanges or similar means 21, 22.

Lugs 23, 24 are arranged on the inside of the walls of the halves at suitable places and each lug on one part in alignment with another lug of the other part.

In assembling the halves preferably into an as airtight as possible closing unit which has a smooth surface, bolts 25 are inserted in the holes of the registering lugs and pressed into those holes when the halves are pressed together. For this purpose the bolts fit as snugly as possible into the holes of the lugs.

The top portions 26, 27 of the last are somewhat stronger and enclose halves 28, 29 of two apertures into which handles or supports 30 can be inserted.

If the last is to be heated from the inside, tubular rods 30 are inserted in those holes and heated gas or steam from the curing chamber is admitted through them into the interior of the hollow last.

In the walls of the last holes 31 may also be provided through which air and moisture can be sucked out of the rubberized material assembled on the last. To this effect again tubular rods are airtightly inserted in the holes 28, 29 of the then airtightly closed last and connected with a suitable suction means, such as an air pump.

It will be appreciated from the above that the last is thin-walled and correspondingly light in weight. Ribs may be provided inside the hollow body of the last in order to reinforce the walls, if desired, and to further reduce their thickness. In this way considerable saving in moldable material can be achieved.

Since the portions of which the last is composed leave the mold in exact shape ready for use and usually do not need any finishing, they can be made airtightly fitting into each other, if desired, e. g. for sucking moisture out of the rubber pieces assembled on the last. In any case, the halves can be combined to form a smooth outer surface, and no open seams are present into which the tacky material could enter.

The molding of the halves or parts requires a short time only, and the assembly by means of the bolts can easily and quickly be effected in a press. The lasts do not expand during manufacture of the shoes, and as hollow bodies they are handled easily without unduly fatiguing the worker. They can be applied with any process of manufacture in which rubber stock containing a vulcanizer or accelerator is used and treated either by outer pressure and heat only or by heat from the inside also, or even if suction is to be performed, before or while the rubber pieces assembled on the last are being cured. The lasts are not attacked by any chemical, used in such manufacture.

What I claim is:

1. A form or last for the manufacture of rubber boots or shoes, comprising a hollow body, composed of tightly fitting complementary parts of molded thermo-setting resinous material of a specific weight considerably below 2.5 solid at 280° F. and non-attackable by chemicals used in said manufacture, each part comprising thin but rigid walls, lugs on the inside of said walls and in alignment on opposite parts, said lugs provided with aligned bores over part of their length and open towards the inside of the hollow body, edges shaped to engage complementary shaped edges of another part to secure a smooth surface of the assembled body, and bolts pressed from the inside into aligned bores of pairs of said lugs when said parts are assembled.

2. A form of or last for the manufacture of rubber boots or shoes, comprising a hollow body, composed of tightly fitting complementary parts of molded thermo-setting resinous material of a specific weight considerably below 2.5, solid at 280° F. and non-attackable by chemicals used in said manufacture, each part comprising thin but rigid walls provided with reinforcing ribs and lugs on the inside, said lugs in alignment on opposite parts, said lugs provided with aligned bores over part of their length and open towards the inside of the hollow body, edges shaped to engage complementary shaped edges of another part to secure a smooth surface of the assembled body, and bolts pressed from the inside into aligned bores of pairs of said lugs when said parts are assembled.

3. A form or last for the manufacture of rubber boots or shoes comprising a hollow body composed of tightly fitting complementary parts of a molded and cured condensation product of a phenol and formaldehyde base admixed with about 30% to 80% filler of asbestos, each part comprising thin but rigid walls, lugs on the inside of said walls and in alignment on opposite parts, said lugs provided with aligned bores over part of their length and open towards the inside of the hollow body, edges shaped to engage complementary shaped edges of another part to ensure a smooth surface of the assembled body, and bolts pressed from the inside into aligned bores of pairs of said lugs when said parts are assembled.

LEO NAST.